US009311966B1

(12) United States Patent
Lee et al.

(10) Patent No.: US 9,311,966 B1
(45) Date of Patent: Apr. 12, 2016

(54) HEMMED SEAL FOR A STORAGE DEVICE ENCLOSURE

(71) Applicant: SEAGATE TECHNOLOGY LLC, Cupertino, CA (US)

(72) Inventors: Jae Suk Lee, Yongin-si (KR); Sung Kwon Choi, Yongin-si (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 55 days.

(21) Appl. No.: 14/605,660

(22) Filed: Jan. 26, 2015

(51) Int. Cl.

| | |
|---|---|
| ***G11B 33/08*** | (2006.01) |
| ***G11B 33/14*** | (2006.01) |
| ***G11B 5/127*** | (2006.01) |
| ***G11B 25/04*** | (2006.01) |

(52) U.S. Cl.
CPC .......... *G11B 33/1466* (2013.01); *G11B 5/1272* (2013.01); *G11B 25/043* (2013.01); *G11B 33/1446* (2013.01)

(58) Field of Classification Search
CPC .. G11B 25/043; G11B 33/08; G11B 33/1446; G11B 33/1466
USPC ............ 360/99.16, 99.17, 99.18, 99.19, 99.2, 360/99.21
See application file for complete search history.

(56) References Cited

U.S. PATENT DOCUMENTS

| | | | | |
|---|---|---|---|---|
| 4,367,503 | A * | 1/1983 | Treseder | 360/99.18 |
| 5,092,536 | A * | 3/1992 | Gelardi et al. | 242/343 |
| 5,448,433 | A * | 9/1995 | Morehouse et al. | 360/97.21 |
| 5,490,930 | A * | 2/1996 | Krull | 210/443 |
| 5,528,092 | A * | 6/1996 | Ohta | 310/67 R |
| 5,654,848 | A * | 8/1997 | Maiers et al. | 360/98.01 |
| 5,696,648 | A | 12/1997 | Jeong et al. | |
| 6,061,204 | A | 5/2000 | Tong | |
| 6,069,772 | A * | 5/2000 | Braunheim et al. | 360/244.6 |
| 6,392,838 | B1 | 5/2002 | Hearn et al. | |
| 6,525,931 | B2 * | 2/2003 | Yagenji et al. | 361/679.33 |
| 6,556,372 | B2 * | 4/2003 | Hearn et al. | 360/99.21 |
| 7,362,541 | B2 * | 4/2008 | Bernett et al. | 360/99.21 |
| 7,583,476 | B2 * | 9/2009 | Hanrahan et al. | 360/265.6 |
| 7,692,891 | B2 * | 4/2010 | Hatchett | G11B 33/1466 360/99.18 |
| 7,852,601 | B1 * | 12/2010 | Little | 360/99.22 |
| 8,031,431 | B1 | 10/2011 | Berding et al. | |
| 8,279,552 | B2 | 10/2012 | Stipe | |
| 8,335,050 | B2 | 12/2012 | Kavosh et al. | |
| 8,477,449 | B2 * | 7/2013 | Choi | 360/97.11 |
| 8,780,495 | B2 * | 7/2014 | Jeon | 360/99.15 |
| 2012/0275106 | A1 | 11/2012 | McGuire, Jr. | |
| 2012/0275287 | A1 | 11/2012 | McGuire, Jr. et al. | |
| 2015/0009789 | A1 | 1/2015 | Freeman | |

* cited by examiner

*Primary Examiner* — Brian Miller
(74) *Attorney, Agent, or Firm* — HolzerIPLaw, PC

(57) ABSTRACT

A storage device enclosure may include a baseplate having a bottom portion and walls extending from a perimeter of the bottom portion, a cover that includes a planar interface surface with the baseplate, and a gasket configured to be compressed between the baseplate and the cover at the interface surface. The cover may include a skirt extending about a perimeter of the cover and one or more discrete areas with a hem in place of the skirt. The baseplate may include one or more close clearance areas are thinner and that correspond to areas of the cover that include the hem. One or more hemmed seals are formed when the baseplate and the cover are pressed together.

15 Claims, 5 Drawing Sheets

HEMMED SEAL FOR A STORAGE DEVICE ENCLOSURE

SUMMARY

Certain embodiments of the present disclosure include a storage device enclosure comprising a baseplate that secures one or more electronic components of the storage device within the enclosure; and a cover that interfaces with the baseplate about a perimeter of the cover to form the enclosure, wherein the cover includes a hemmed seal at a portion of the interface with the baseplate.

Other implementations are also described and recited herein.

BRIEF DESCRIPTIONS OF THE DRAWINGS

DETAILED DESCRIPTIONS

A storage device enclosure is a specialized casing that seals and protects internal components of the storage device while providing a mechanism to provide power to the storage device and allow the storage device to communicate with one or more connected external computing systems. In implementations where the internal components of the storage device include one or more spinning storage media or platters (e.g., magnetic or optical media), the storage device enclosure protects the media from damage from an external environment (e.g., contaminants, impacts, moisture, etc.). Such example drives include hard disc drives, digital optical disc drives, or any other spinning circular storage media drives.

Historically, increasing storage capacity in disc drives has been achieved by increasing areal density, which has been achieved by incrementally improving head, media, and channel technology. However, as areal density has increased, the rate of its increase has slowed. Storage capacity in disc drives can be also increased by increasing the physical diameter (and thus the available storage area) of storage platters within the disc drive. However, disc diameter has been limited by the exterior width of the disc drive, subtracting each opposing wall thickness and any applicable tolerances. Due to packaging requirements, outside dimensions of disc drives are predefined based on industry standard sizes (e.g., "5.25-inch" or 146.1 mm×203 mm×41.4 mm, "3.25 inch" or 101.6 mm×146.05 mm×25.4 mm, "2.5-inch" or 69.85 mm×100.2 mm×9.5 mm, etc.). These industry standard sizes are not easily changed.

Further, enclosure wall thickness is used to maintain structural integrity of the enclosure. For example, a form-in-place gasket (FIPG) is typically used to seal an enclosure baseplate and an enclosure cover together in order to prevent contaminants from entering the storage device. The baseplate walls are sufficiently thick to allow the FIPG to seal the cover to the baseplate under compression (e.g., by applying a number of screws compressively holding the cover to the baseplate). However, this substantial baseplate wall thickness reduces the maximum allowable diameter of the storage platters within the enclosure. For example, maximum storage platter diameter in 2.5-inch drives has typically been limited to 65 mm. Certain embodiments of the present disclosure are accordingly directed to enclosures that can accommodate larger diameter storage platters without exceeding industry standard enclosure dimensions.

Figure 1:
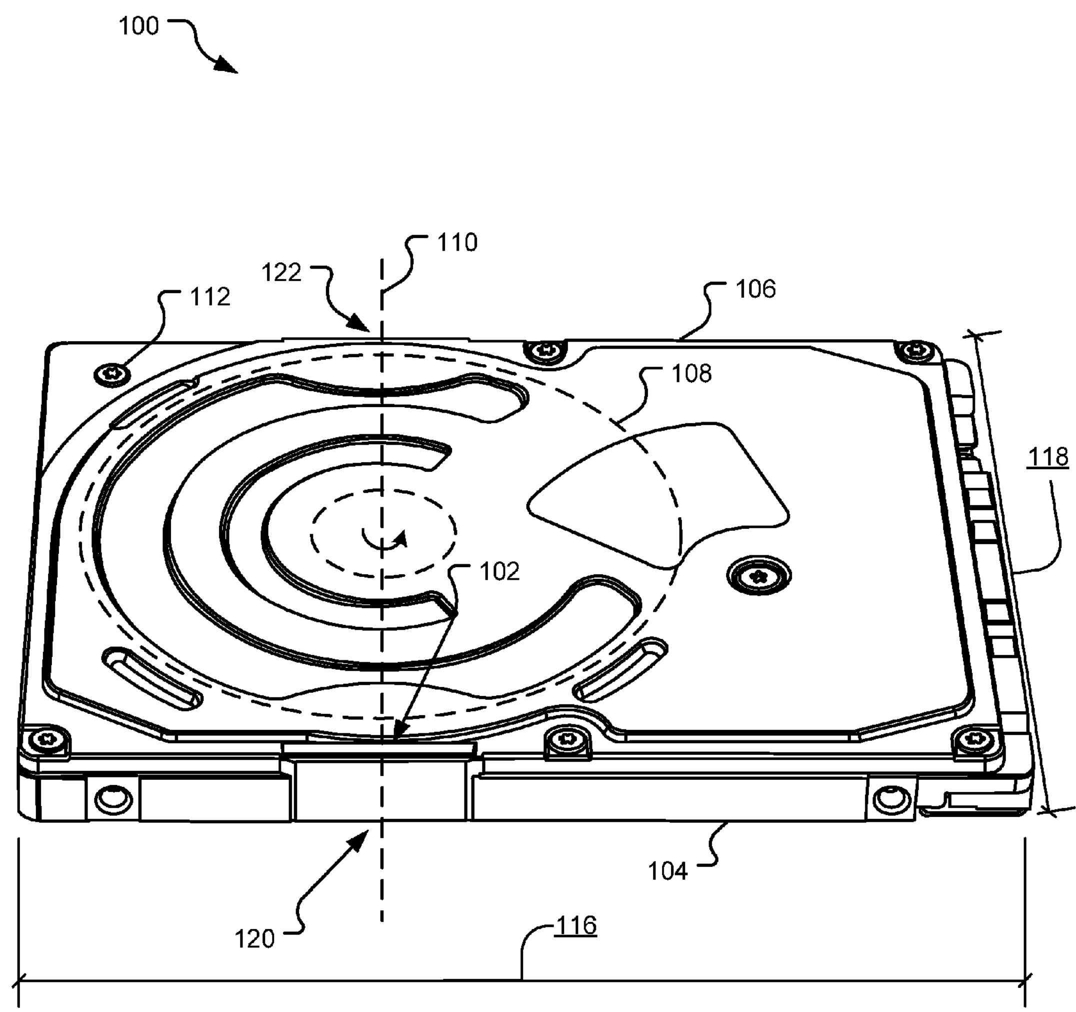
FIG. 1 illustrates a perspective view of an example disc drive including a hemmed seal between a base or baseplate and a cover of the disc drive.

FIG. 1 illustrates a perspective view of an example disc drive 100 utilizing a hemmed seal 102 between a base or baseplate 104 and a cover 106 of the disc drive 100. Various internal components of the disc drive 100 (e.g., storage medium discs or platters 108 (illustrated by hidden lines)) are mounted to the baseplate 104. The baseplate 104 generally includes a bottom portion and walls extending from a perimeter of the bottom portion, which forms a cavity (not shown) where the internal components are secured. The internal components include a spindle motor (not shown), which rotates the platters 108 about axis 110 at a high speed while data is read from and written to the platters 108. The platters 108 and other internal components of the disc drive 100 are hidden from view with the cover 106 in place, but the platters 108 are shown in dashed lines for context.

The cover 106 cooperates with the baseplate 104 to form an internal, sealed environment for the internal components of the disc drive 100. More specifically, the cover 106 is compressed against the baseplate 104 with a gasket (not shown) there between and fasteners (e.g., screw 112) are received in holes (not shown) to maintain the compression seal between the cover 106 and the baseplate 104. The cover may also include one or more of the depicted contours that correspond to the electronic components secured to the baseplate 104 or add stiffness to the overall cover 106. The combination of the cover 106 and the baseplate 104 is referred to herein as a storage device enclosure.

The baseplate 104 has a predefined length 116 and a predefined width 118, often dictated by industry standard sizes. As a result, the outer diameter of the platters 108 can not exceed the predefined width 118 of the baseplate 104, subtracting wall thicknesses and any applicable tolerances. As the platter 108 diameter is increased to maximize storage capacity of the drive 100, the platter 108 diameter approaches the predefined width 118 value and the baseplate 104 wall thickness is reduced at least at one or more close clearance areas (e.g., close clearance areas 120, 122. Further, in one or both of the close clearance areas 120, 122, the baseplate 104 wall thickness is reduced to a value less than that required to effectively utilize the gasket to seal the cover 106 to the baseplate 104 using a conventional bent skirt seal (discussed in further detail with respect to FIGS. 2 and 3). As a result, the hemmed seal 102 disclosed herein may be used alone or in combination with a conventional bent skirt seal to ensure an effective seal along the entire sealing surface between the cover 106 and the baseplate 104.

Figure 2:
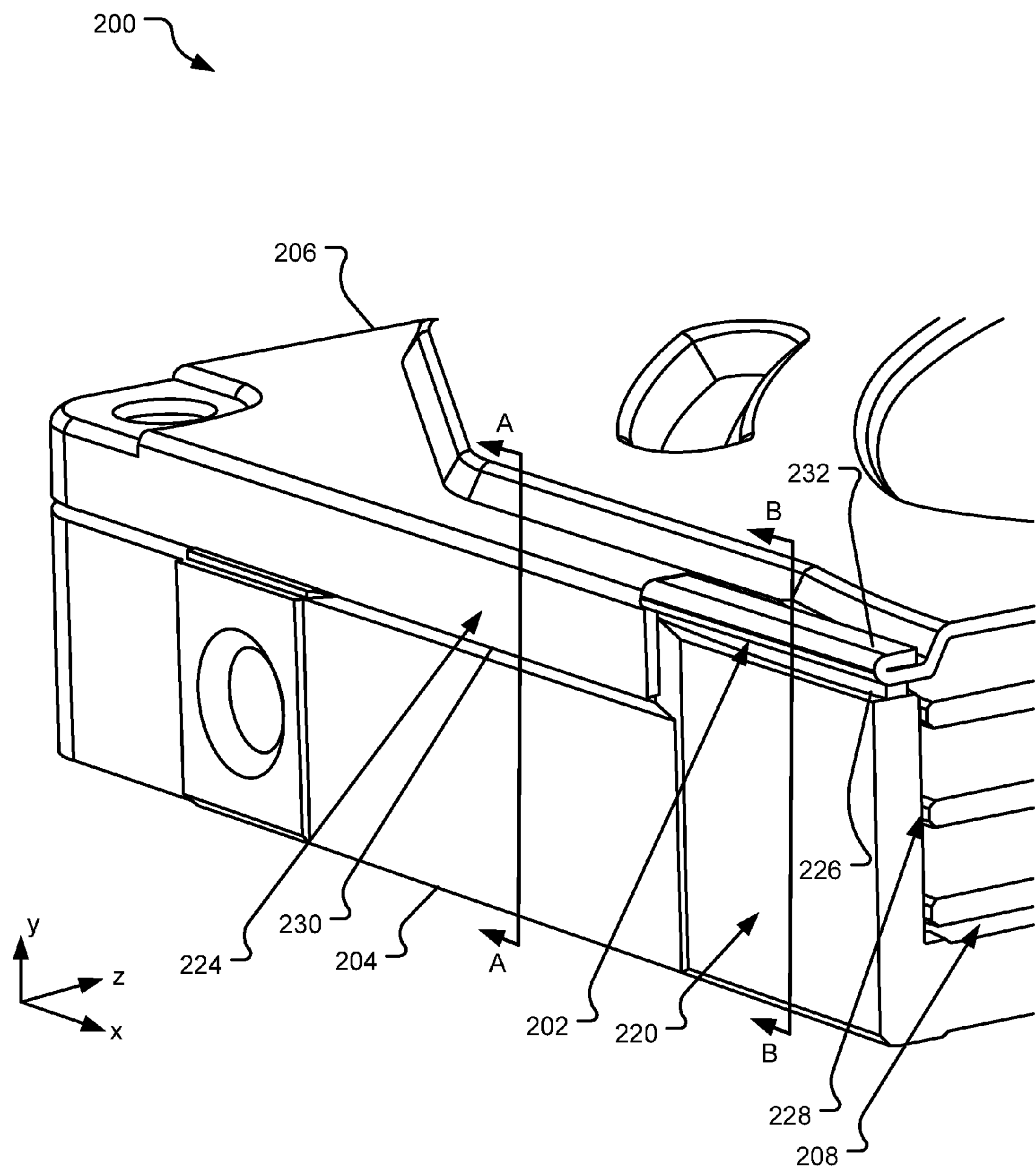
FIG. 2 illustrates a partial cross-sectional perspective view of an example disc drive utilizing both a bent skirt seal and a hemmed seal.

FIG. 2 illustrates a partial cross-sectional perspective view of an example disc drive 200 utilizing both a bent skirt seal 224 and a hemmed seal 202. The drive 200 includes a baseplate 204 interfaced with a cover 206 and having a gasket 226 compressed there between. The drive 200 also includes an array of platters 208 that have a close tolerance 228 (e.g., 0.20 mm-0.40 mm) to the baseplate 204 wall at the depicted close clearance area 220.

In order to allow for platters 208 that are comparatively larger than those typically utilized in a drive utilizing only the bent skirt seal 224 without increasing the overall drive 200 exterior dimensions, the drive 200 utilizes the hemmed seal 202 in the close clearance areas 220 to reduce the baseplate 204 wall thickness in the close clearance areas 220. In an example implementation, 67.00 mm diameter platters may be used within a drive 200 that conventionally utilizes 65.00 mm diameter platters. The additional platter diameter may be used to increase the overall storage capacity of the drive 200 while utilizing substantially the same exterior dimensions as a conventional drive. Further, the outer surface of the baseplate wall adjacent the hemmed seal 202 may be extended beyond the surrounding baseplate wall adjacent the bent skirt seal 224 up to a point defining any required outer dimensions of the baseplate 204, if applicable. This may further increase the platter diameter than may be used within the drive 200.

The bent skirt seal 224 utilizes a skirt 230 that extends about a perimeter of the cover 206 and is oriented substantially 90 degrees from the major x-z plane of the cover 206. The skirt 230 provides the cover 206 localized stiffening, particularly in the y-direction about the perimeter of the cover 206 where the cover 206 is interfaced with the baseplate 204. The localized stiffening provided by the skirt 230 allows the cover 206 to interface with the baseplate 204 under compression without substantial deformation. The bent skirt seal 224 is described in further detail with reference to FIG. 3 below.

The hemmed seal 202 omits the skirt 230 of the bent skirt seal 224 and instead utilizes a hem 232 that extends about a perimeter of the cover 206. The hem 232 utilizes a portion of the cover 206 extending beyond the perimeter of the cover 206 and folds such portion back upon itself such that it lies substantially in the same major x-z plane of the cover 206. As a result, the hem 232 also provides localized stiffening, particularly in the y-direction about the perimeter of the cover 206 where the cover 206 is interfaced with the baseplate 204. The localized stiffening provided by the hem 232 also allows the cover 206 to interface with the baseplate 204 under compression without substantial deformation. Further, the hemmed seal 202 permits a thinner baseplate 204 wall in the local area of the hemmed seal 202 as compared to the bent skirt seal 224. This thinner baseplate 204 wall permits the larger diameter platters 208 discussed above. The hemmed seal 202 is described in further detail with reference to FIG. 4 below.

Figure 3:
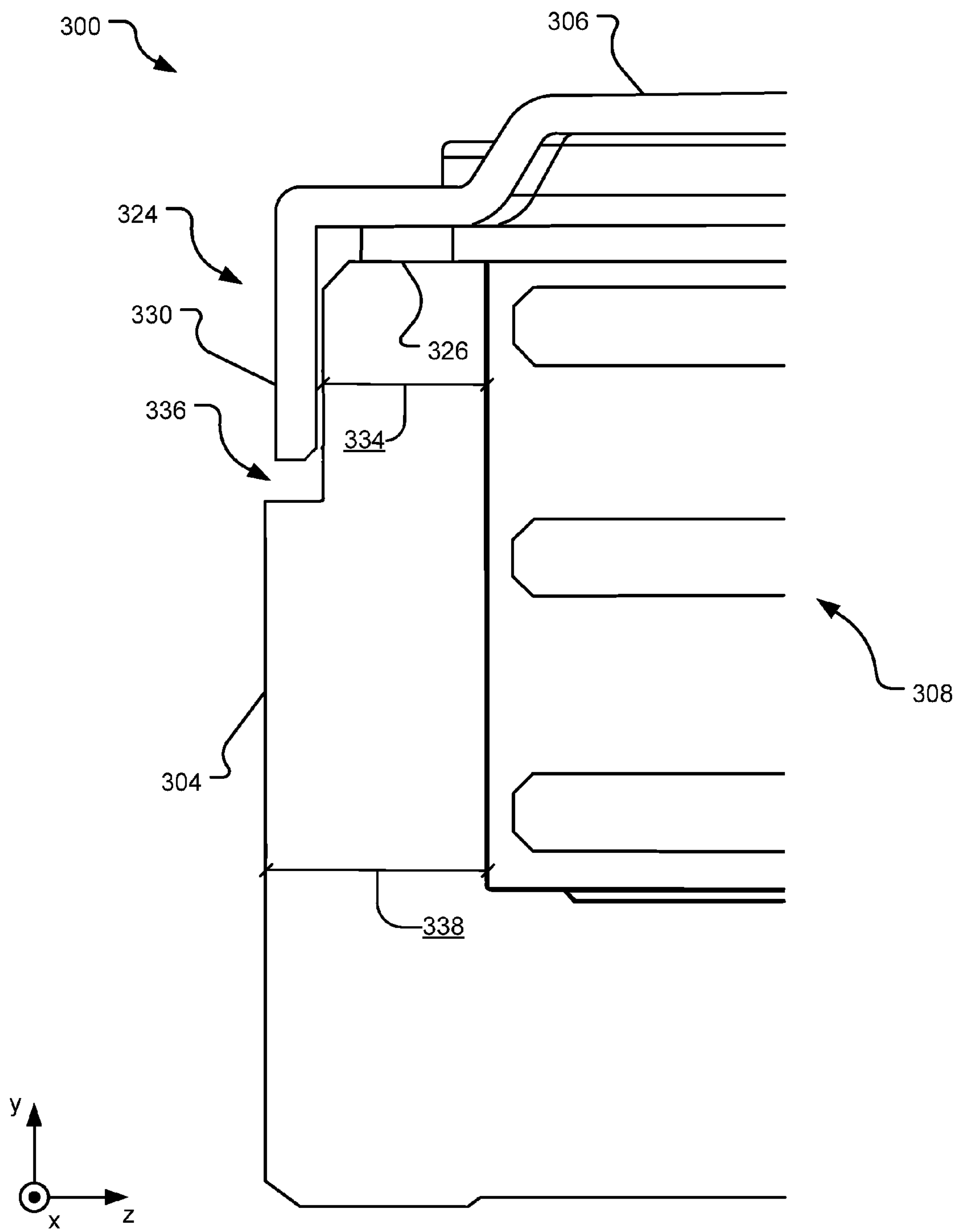
FIG. 3 illustrates a partial cross-sectional elevation view of the example disc drive of FIG. 2 taken along viewing plane A-A.

FIG. 3 illustrates a partial cross-sectional elevation view of the example disc drive 200 of FIG. 2 taken along viewing plane A-A. Drive 300 includes a baseplate 304 compressively interfaced with a cover 306 (collectively referred to herein as an enclosure) with an array of platters 308 sealed within the drive 300. FIG. 3 specifically illustrates a bent skirt seal 324 between the baseplate 304 and the cover 306.

The bent skirt seal 324 utilizes a skirt 330 that extends about a perimeter of the cover 306 and is oriented substantially 90 degrees from the major x-z plane of the cover 306. The skirt 330 provides the cover 306 localized stiffening, particularly in the y-direction about the perimeter of the cover 306 where the cover 306 is interfaced with the baseplate 304. The localized stiffening provided by the skirt 330 allows the cover 306 to interface with the baseplate 304 under compression without substantial deformation.

In various implementations, a gasket 326 is compressed between the baseplate 304 and the cover 306 to ensure proper sealing. The gasket 326 is a compressible sealing material that may be preformed or formed in place (FIPG). The FIPG gasket 326 may be formed on the cover 306 and then compressed against the baseplate 304 or formed on the baseplate 304 and compressed against the cover 306. The gasket 326 is compressed between the baseplate 304 wall and the cover 306 using, for example, fasteners (not shown) that extend through the cover 306 and into the baseplate 304 wall. When compressed, the gasket 326 occupies at least a substantial portion (i.e., greater than 25%) of wall thickness 334 and in some implementations a majority (i.e., greater than 50%) of the wall thickness 334.

Further, the gasket 326 may require a minimum interface surface width to properly and reliably seat. As a result, the baseplate wall thickness 334 is equal to or greater than the minimum width for the gasket 326 to properly and reliably seat (e.g., a minimum wall thickness 334 of 1.00 mm). Still further, the gasket 326 may require a flat surface for proper sealing as any contour of the gasket interface surfaces may significantly increase the potential for gasket rupture.

The baseplate 304 also incorporates a step 336 to accommodate the skirt 330 that increases the baseplate wall thickness 334 to baseplate wall thickness 338. If the exterior dimensions of the drive 300 are predefined, the increased wall thickness decreases the available interior space available to accommodate the platters 308. In one implementation, the bent skirt seal 324 is only utilized in perimeter locations of the enclosure that do not have a tight tolerance with the platters 308 sealed therein. In such locations, the reduced interior space available to accommodate the platters 308 is not a factor that decreases the overall platter diameter that may be used within the drive 300. Regions of the baseplate 304 that have a tight tolerance fit with the platters 308 (e.g., at close clearance areas 102, 122 of FIG. 1) may utilize hemmed seal 402 of FIG. 4 described in detail below.

In other implementations, the bent skirt seal 324 is combined with one or more other interface types described herein or interface types outside the scope of this disclosure (e.g., tape seal, flat cover, bending cover cut-out, etc.). In various implementations, the baseplate 304 and the cover 306 are cast, stamped, machined, extruded, drawn, forged, drilled, rolled, bent, sheared, or any combination thereof to be formed to the desired dimensions and functional characteristics. Other manufacturing techniques for forming the baseplate 304 and the cover 306 are contemplated herein. Further, the baseplate 304 and the cover 306 may be formed of a metallic alloy (e.g., steel, various aluminum alloys, etc.), plastic, or any combination thereof to have the desired dimensions and functional characteristics.

Figure 4:
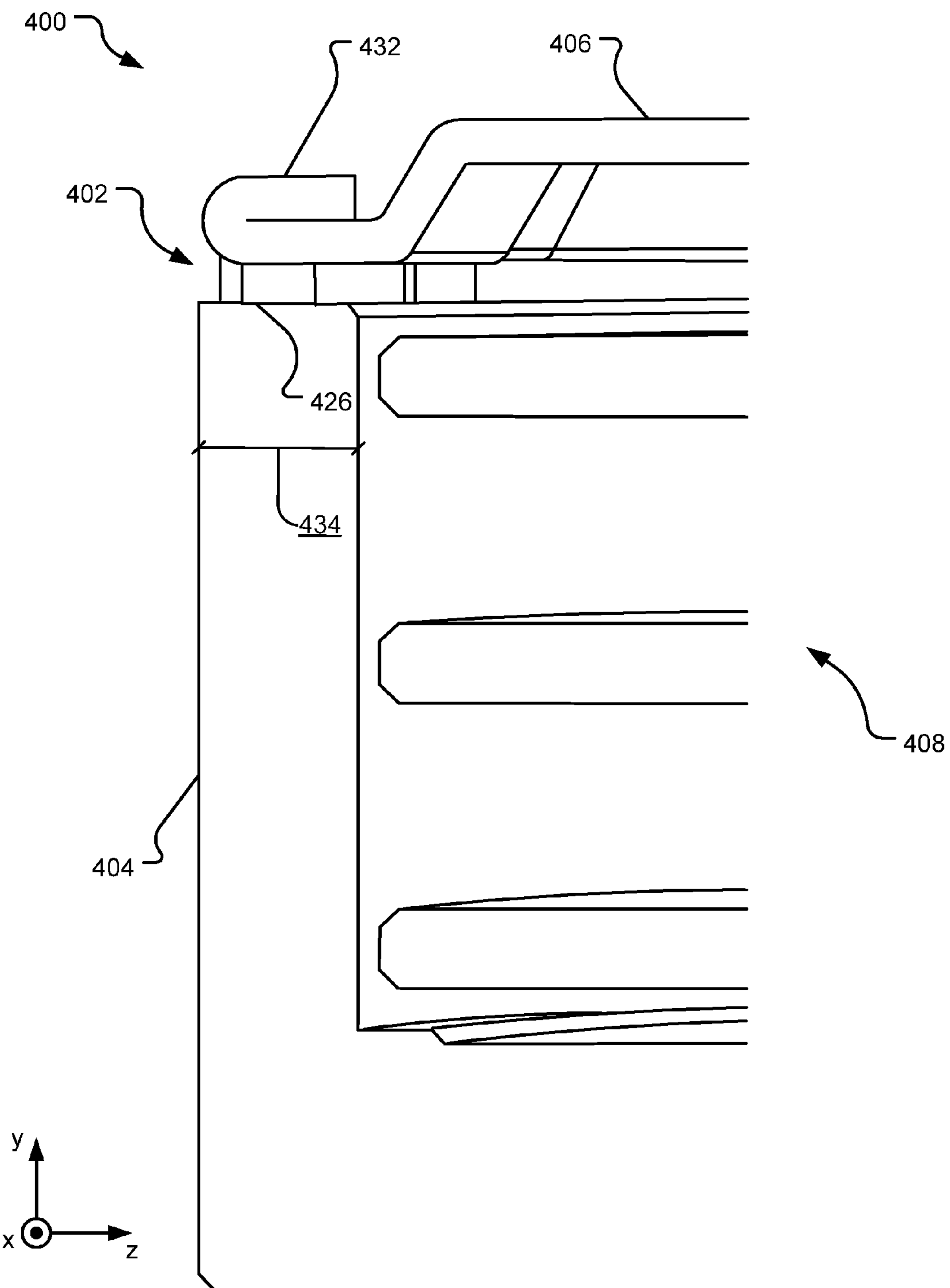
FIG. 4 illustrates a partial cross-sectional elevation view of the example disc drive of FIG. 2 taken along viewing plane B-B.

FIG. 4 illustrates a partial cross-sectional elevation view of the example disc drive 200 of FIG. 2 taken along viewing plane B-B. Drive 400 includes a baseplate 404 compressively interfaced with a cover 406 (collectively referred to herein as an enclosure) with an array of platters 408 sealed within the drive 400. FIG. 4 specifically illustrates a hemmed seal 402 between the baseplate 404 and the cover 406.

The hemmed seal 402 omits the skirt 330 of the bent skirt seal 324 of FIG. 3 and instead utilizes a hem 432 that extends about a perimeter of the cover 406. The hem 432 utilizes a portion of the cover 406 extending beyond the perimeter of the cover 406 and folds such portion back upon itself such that it lies substantially in the same major x-z plane of the cover 406. As a result, the hem 432 also provides localized stiffening, particularly in the y-direction about the perimeter of the cover 406 where the cover 406 is interfaced with the baseplate 404. The localized stiffening provided by the hem 432 also allows the cover 406 to interface with the baseplate 404 under compression without substantial deformation. Further, the hemmed seal 402 permits a thinner baseplate 404 wall in the local area of the hemmed seal 402 as compared to the bent skirt seal 324 of FIG. 3. This thinner baseplate 404 wall permits the larger diameter platters 408 discussed above.

In various implementations, a gasket 426 is compressed between the baseplate 404 and the cover 406 to ensure proper sealing. The gasket 426 is a compressible sealing material that may be preformed or formed in place (FIPG). The FIPG gasket 426 may be formed on the cover 406 and then compressed against the baseplate 404 or formed on the baseplate 404 and compressed against the cover 406. The gasket 426 is compressed between the baseplate 404 wall and the cover 406 using, for example, fasteners (not shown) that extend through the cover 406 and into the baseplate 404 wall. When compressed, the gasket 426 occupies at least a substantial portion (i.e., greater than 25%) of wall thickness 434 and in some implementations a majority (i.e., greater than 50%) of the wall thickness 434.

Further, the gasket 426 may require a minimum interface surface width to properly and reliably seat. As a result, the baseplate wall thickness 434 is equal to or greater than the minimum surface area for the gasket 426 to properly and reliably seat. Still further, the gasket 426 may require a flat surface for proper sealing as any contour of the gasket interface surfaces may significantly increase the potential for gasket rupture.

As compared to the bent skirt seal 324 of FIG. 3, the hemmed seal 402 omits the skirt 330 and the baseplate 404 omits the step 336. Thus the hemmed seal 402 allows the baseplate 404 to maintain the baseplate wall thickness 434 throughout the height of the baseplate 404. As a result, if the exterior dimensions of the drive 400 are predefined, the available interior space available to accommodate the platters 408 is increased as compared to the interior space depicted in FIG. 3. In one implementation, the hemmed seal 402 is only utilized in perimeter locations of the enclosure that have tight tolerances with the platters 408 sealed therein (e.g., at close clearance areas 102, 122 of FIG. 1). In other implementations, the hemmed seal 402 is utilized all around the top perimeter of the baseplate 404 that interfaces with the cover 404, thus omitting any use of the bent skirt seal 324 of FIG. 3.

In still other implementations, the hemmed seal 402 is combined with one or more other interface types described herein or interface types outside the scope of this disclosure. In various implementations, the baseplate 404 and the cover 406 are formed, machined, stamped, pressed or any combination thereof to create the depicted structures.

Figure 5:
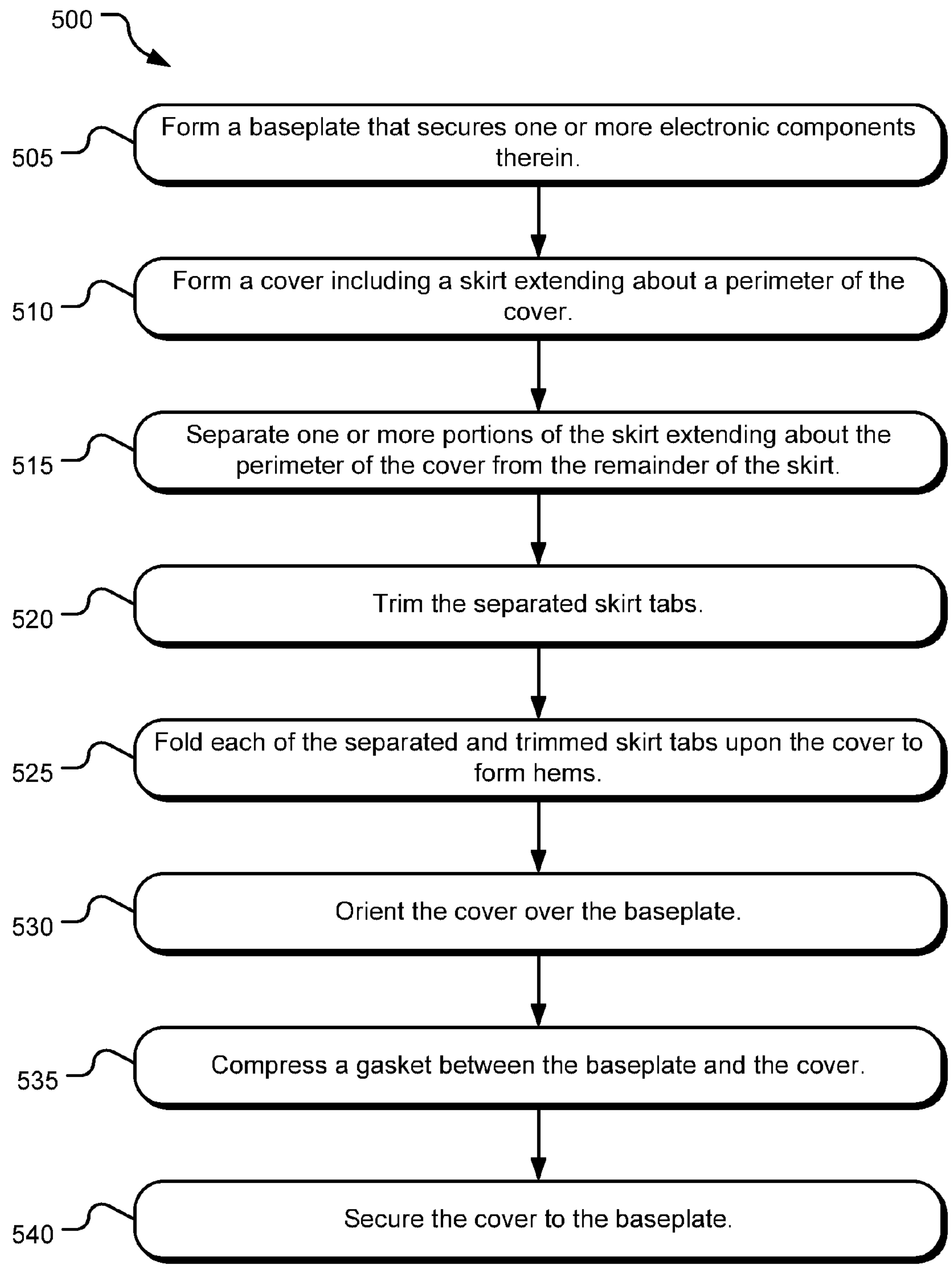
FIG. 5 illustrates example operations for manufacturing a storage device enclosure incorporating one or more hemmed seals.

FIG. 5 illustrates example operations 500 for manufacturing a storage device enclosure incorporating one or more hemmed seals. A first forming operation 505 forms a baseplate that secures one or more electronic components therein. The baseplate generally includes a bottom portion and walls extending from a perimeter of the bottom portion, which forms a cavity where the electronic components (e.g., circular rotatable media) are secured. One or more close clearance areas are provided between the electronic components and the baseplate walls. In various implementations, circular rotatable media are generally mounted on a motorized axis within the baseplate. Additional electronic components may also be secured within the baseplate.

The baseplate may have varying wall thicknesses depending on intended locations of desired seals with a corresponding cover. For example, the baseplate may have thicker stepped walls in areas that utilize a bent skirt seal. Further, the baseplate may thinner planar walls in areas that utilize a hemmed seal. Further, in implementations that utilize a hemmed seal at a close clearance area, the outer surface of the baseplate wall may be extended beyond the surrounding baseplate wall up to a point defining the outer dimensions of the baseplate.

The baseplate may be cast, stamped, machined, extruded, drawn, forged, drilled, rolled, bent, sheared, or any combination thereof to be formed to the desired dimensions and functional characteristics. Other manufacturing techniques for forming the baseplate are contemplated herein. Further, the baseplate may be formed of a metallic alloy (e.g., steel, various aluminum alloys, etc.), plastic, or any combination thereof to have the desired dimensions and functional characteristics. Other suitable materials for forming all or part of the baseplate are contemplated herein. The electronic components may be secured within the baseplate immediately following the forming operation 505 or at any point prior to orienting operation 530.

A second forming operation 510 forms a cover including a skirt extending about a perimeter of the cover. The cover may also include one or more contours that correspond to the electronic components secured to the baseplate or add stiffness to the overall cover. The skirt provides additional stiffening of the cover about the perimeter of the cover, which aids to forming the bent skirt seal discussed herein. The skirt also provides material available to form the hem seal discussed herein.

A separating operation 515 separates one or more portions of the skirt extending about the perimeter of the cover from the remainder of the skirt. More specifically, in areas of the cover that will be used to form a hemmed seal, the skirt is cut at each side of the intended hemmed seal up to a point where the skirt meets the remaining cover. The cut skirt is left attached to the cover along a line where the skirt meets the remaining cover. The end result is one or more skirt tabs that may be manipulated independently from the remaining skirt.

A trimming operation 520 trims the separated skirt tabs. In some implementations, the skirt is too deep to form a desired hem. In those implementations, the separated portions of the skirt are trimmed such that the separated tabs are shallower than the surrounding skirt. The extent of the trimming operation 520, including omitting the trimming operation 520 may depend upon avoiding any contour of the cover when folding operation 525 is performed.

The folding operation 525 folds each of the separated and trimmed skirt tabs upon the cover to form hems. The resulting hems increase the rigidity of the cover perimeter where the hems are formed without the presence of the skirt. Further, the folding operation 525 reduces the potential for user injury by providing a bent edge at the perimeter of the cover, rather than a cut edge. As discussed in detail with regard to the baseplate, the cover, including the hemmed seal may be manufactured using any available techniques and using any suitable materials to achieve the desired dimensions and functional characteristics of the cover.

An orienting operation 530 orients the cover over the baseplate. The cover interfaces with the baseplate with a gasket (e.g., a form-in-place gasket) there between. The interface between the baseplate, the gasket, and the cover in the close clearance areas may utilize one or more of the bent skirt seals, hemmed seals, or other seals described in detail herein. More specifically, the baseplate wall may be thinner in locations utilizing a hemmed seal than locations utilizing a bent skirt seal and/or other seals, potentially increasing the space inside the baseplate available to secure the electronic components.

A compressing operation 535 compresses the gasket between the baseplate and the cover forming the one or more bent skirt seals, hemmed seals, or other seals described in detail herein. This seals the electronic components within the storage device enclosure.

A securing operation 540 secures the cover to the baseplate. In various implementations, the securing operation may be accomplished by screwing the cover to the baseplate, taping the cover to the baseplate, welding the cover to the baseplate, gluing the cover to the baseplate, etc. As a result, the electronic components are either permanently or selectively secured within the storage device enclosure.

The storage device enclosure sealing techniques described and claimed herein may apply to any rotating disc storage drive, for example. The logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A storage device enclosure comprising:

a baseplate having a wall with a thickness that secures one or more electronic components of the storage device within the enclosure; and a cover that interfaces with the baseplate about a perimeter of the cover to form the enclosure, wherein the cover includes a folded hem that defines a hemmed seal at a portion of the interface with the baseplate and a bent skirt seal at another portion of the interface with the baseplate, wherein the wall of the baseplate has a greater thickness adjacent the bent skirt seal than adjacent the hemmed seal.

2. The storage device enclosure of claim 1, wherein the hem includes a portion of the cover oriented adjacent the baseplate that is folded upon itself in a return.

3. The storage device enclosure of claim 1, further comprising:

a gasket compressed between the cover and the baseplate at the interface.

4. The storage device enclosure of claim 3, wherein the gasket is a form-in-place gasket that occupies a majority of a planar interface between the cover and the baseplate.

5. The storage device enclosure of claim 1, wherein the hemmed seal is located at a close clearance area between the baseplate and the electronic components secured therein.

6. The storage device enclosure of claim 1, wherein the one or more electronic components includes one or more circular rotatable storage media.

7. The storage device enclosure of claim 6, wherein the storage media are greater than 65 mm in diameter.

8. A method of manufacturing a storage device enclosure comprising the steps of:

providing a baseplate that secures one or more electronic components of the storage device within the enclosure; and providing a cover that interfaces with the baseplate about a perimeter of the cover, the cover formed by:

creating a skirt that extends about a perimeter of the cover;

separating a first portion of the skirt to form a separated skirt; and folding the separated skirt upon itself to create a hem that forms a hemmed seal at a first portion of the interface of the cover with the baseplate.

9. The method of claim 8, wherein the step of forming the cover further includes trimming a portion of the separated skirt prior to folding the separated skirt upon itself to create the hem.

10. The method of claim 8, wherein the step of forming the cover further includes folding a second portion of the skirt different that the first portion of the skirt to create a bent skirt seal at a second portion of the interface of the cover with the baseplate different than the first portion of the interface.

11. The method of claim 10, wherein the step of providing the baseplate comprises providing a baseplate with a greater thickness adjacent the bent skirt seal than adjacent the hemmed seal.

12. The method of claim 8, further comprising the step of:

compressing the cover onto the baseplate with a gasket there between.

13. A hard disc drive comprising: one or more circular rotatable storage media; a baseplate that secures the storage media within the hard disc drive, the baseplate having a wall; and a cover that interfaces with the baseplate about a perimeter of the cover to form the hard disc drive, wherein the cover includes a folded hemmed seal at one or more close clearance areas of interface of the cover with the baseplate and a bent skirt seal formed by a skirt substantially 90 degrees to the cover, wherein the wall of the baseplate has a greater thickness at the bent skirt seal than at the hemmed seal.

14. The hard disc drive of claim 13, wherein the hemmed seal includes a portion of the cover oriented adjacent the baseplate that is folded upon itself.

15. The hard disc drive of claim 13, wherein one or more of the storage media are greater than 65 mm in diameter.

* * * * *